(12) United States Patent
Birkeland

(10) Patent No.: US 6,658,026 B1
(45) Date of Patent: Dec. 2, 2003

(54) METHOD IN CONNECTION WITH SERIAL DATA TRANSFER TO RECOGNIZE A FIXED PATTERN

(75) Inventor: Bjørn Birkeland, Froland (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/308,814

(22) PCT Filed: Nov. 26, 1997

(86) PCT No.: PCT/NO97/00317
§ 371 (c)(1),
(2), (4) Date: Aug. 19, 1999

(87) PCT Pub. No.: WO98/24030
PCT Pub. Date: Jun. 4, 1998

(30) Foreign Application Priority Data

Nov. 27, 1996 (NO) .................................. 965051

(51) Int. Cl.⁷ .................. G06F 13/00; H04L 29/06; H04L 7/04
(52) U.S. Cl. ........................ 370/509; 370/514
(58) Field of Search ................... 370/503, 509, 370/512, 514; 375/368

(56) References Cited

U.S. PATENT DOCUMENTS

| 5,177,738 A | 1/1993 | Dell'Oro et al. |
| 5,204,883 A | 4/1993 | Blanc |
| 5,412,610 A | 5/1995 | Suzuki |
| 5,412,754 A | 5/1995 | Le Cun et al. |
| 5,448,560 A | 9/1995 | Chen et al. |
| 5,459,754 A | 10/1995 | Newby et al. |
| 5,572,675 A | 11/1996 | Bergler |

FOREIGN PATENT DOCUMENTS

| EP | 0 563 936 | 10/1993 |
| EP | 0 727 886 | 8/1996 |
| JP | 07202875 | 8/1995 |

OTHER PUBLICATIONS

International Conference on Data Transmission—Advances in Modem and ISDN Technology and Applications, p. 96, Sep. 23–25, 1992.

Primary Examiner—Melvin Marcelo

(57) ABSTRACT

The present invention relates to a method in connection with serial data, to recognize a frame synchronization pattern, and for the sake of providing a fast and reliable search algorithm especially for V.110 synchronization pattern, the present invention suggests a method characterized by examining two successive bytes by performing a binary AND operation between the first byte and a check byte made up from the value of the second byte, examining if the AND operation is zero for thereby establishing whether said first byte and second byte qualify as candidates for the synchronization pattern, and further verifying said candidates by checking further criteria given by the frame in question.

11 Claims, 2 Drawing Sheets

| MEMORY OFFSET | b7 | b6 | b5 | b4 | b3 | b2 | b1 | b0 | |
|---|---|---|---|---|---|---|---|---|---|
| 1 | 0 | 0 | 1 | 1 | 0 | 0 | 0 | 0 | |
| 2 | 0 | 0 | 0 | 0 | 1 | 0 | 0 | 0 | |
| 3 | 0 | 0 | 0* | 0* | 0* | 0* | 0* | 0* | B1-B6 OCTET0 |
| 4 | 0* | 0* | 1* | 0 | 1 | 0 | 1 | 1 | B7-B8 OCTET0, B1-B6 OCTET 1 |
| 5 | 1 | 0 | 1* | 0 | 1 | 1 | 1 | 1 | B7-B8 OCTET1, B1-B6 OCTET 2 |
| 6 | 1 | 1 | 1* | 1 | 1 | 0 | 0 | 0 | B7-B8 OCTET2, B1-B6 OCTET 3 |
| 7 | 1 | 1 | 1* | 1 | 0 | 0 | 1 | 1 | B7-B8 OCTET3, B1-B6 OCTET 4 |
| 8 | 1 | 0 | 1* | 0 | 0 | 0 | 1 | 1 | B7-B8 OCTET4, B1-B6 OCTET 5 |
| 9 | 1 | 0 | 1* | 1 | 1 | 1 | 1 | 1 | B7-B8 OCTET5, B1-B6 OCTET 6 |
| 10 | 1 | 0 | 1* | 0 | 0 | 1 | 0 | 0 | B7-B8 OCTET6, B1-B6 OCTET 7 |
| 11 | 0 | 1 | 1* | 1 | 1 | 0 | 0 | 0 | B7-B8 OCTET7, B1-B6 OCTET 8 |
| 12 | 1 | 1 | 1* | 0 | 1 | 1 | 1 | 1 | B7-B8 OCTET8, B1-B6 OCTET 9 |
| 13 | 1 | 1 | 0 | 0 | 0 | 0 | 0 | 0 | B7-B8 OCTET9 |
| 14 | 0 | 0 | 1 | 0 | 0 | 1 | 0 | 0 | |
| 15 | 1 | 0 | 1 | 1 | 1 | 1 | 1 | 1 | |

NOTE: ASTERIKS * INDICATES SYNCHRONIZATION BITS 80 bits V.110 frame structure

| Octet number | Bit number | | | | | | | |
|:---:|:---:|:---:|:---:|:---:|:---:|:---:|:---:|:---:|
| | 1 | 2 | 3 | 4 | 5 | 6 | 7 | 8 |
| 0 | 0* | 0* | 0* | 0* | 0* | 0* | 0* | 0* |
| 1 | 1* | D1 | D2 | D3 | D4 | D5 | D6 | S1 |
| 2 | 1* | D7 | D8 | D9 | D10 | D11 | D12 | X |
| 3 | 1* | D13 | D14 | D15 | D16 | D17 | D18 | S3 |
| 4 | 1* | D19 | D20 | D21 | D22 | D23 | D24 | S4 |
| 5 | 1* | E1 | E2 | E3 | E4 | E5 | E6 | E7 |
| 6 | 1* | D25 | D26 | D27 | D28 | D29 | D30 | S6 |
| 7 | 1* | D31 | D32 | D33 | D34 | D35 | D36 | X |
| 8 | 1* | D37 | D38 | D39 | D40 | D41 | D42 | S8 |
| 9 | 1* | D43 | D44 | D45 | D46 | D47 | D48 | S9 |

Fig. 1

Fig. 2

| MEMORY OFFSET | b7 | b6 | b5 | b4 | b3 | b2 | b1 | b0 | |
|---|---|---|---|---|---|---|---|---|---|
| 1 | 0 | 0 | 1 | 1 | 0 | 0 | 0 | 0 | B1-B6 OCTET0 |
| 2 | 0 | 0 | 0 | 0 | 1 | 0 | 0 | 0 | |
| 3 | 0 | 0 | 0* | 0* | 0* | 0* | 0* | 0* | |
| 4 | 0* | 0* | 1* | 0 | 1 | 0 | 0 | 0* | B7-B8 OCTET0, B1-B6 OCTET 1 |
| 5 | 1 | 0 | 1* | 0 | 1 | 1 | 1 | 1 | B7-B8 OCTET1, B1-B6 OCTET 2 |
| 6 | 1 | 1 | 1* | 1 | 1 | 0 | 1 | 1 | B7-B8 OCTET2, B1-B6 OCTET 3 |
| 7 | 1 | 1 | 1* | 1 | 0 | 0 | 1 | 1 | B7-B8 OCTET3, B1-B6 OCTET 4 |
| 8 | 1 | 0 | 1* | 0 | 0 | 1 | 0 | 1 | B7-B8 OCTET4, B1-B6 OCTET 5 |
| 9 | 1 | 0 | 1* | 1 | 1 | 1 | 1 | 1 | B7-B8 OCTET5, B1-B6 OCTET 6 |
| 10 | 1 | 0 | 1* | 0 | 0 | 1 | 0 | 0 | B7-B8 OCTET6, B1-B6 OCTET 7 |
| 11 | 0 | 1 | 1* | 1 | 1 | 0 | 0 | 0 | B7-B8 OCTET7, B1-B6 OCTET 8 |
| 12 | 1 | 1 | 1* | 0 | 0 | 1 | 1 | 1 | B7-B8 OCTET8, B1-B6 OCTET 9 |
| 13 | 1 | 1 | 0 | 0 | 0 | 0 | 0 | 0 | B7-B8 OCTET9 |
| 14 | 0 | 0 | 1 | 0 | 1 | 1 | 0 | 0 | |
| 15 | 1 | 0 | 1 | 1 | 1 | 1 | 1 | 1 | |

NOTE: ASTERIKS * INDICATES SYNCHRONIZATION BITS

METHOD IN CONNECTION WITH SERIAL DATA TRANSFER TO RECOGNIZE A FIXED PATTERN

FIELD OF THE INVENTION

The present invention relates to a method in connection with serial data transfer to recognize a fixed synchronization bit pattern.

Although the present invention has been developed in connection with the V.110 protocol, it is to be understood that the general principle of the invention can also find its application in connection with similar systems.

BACKGROUND OF THE INVENTION

For serial data transfer with rate adaption a commonly used protocol is the V.110. When developing equipment for this protocol one will be faced to the problem of how to recognize the V.110 frame synchronization pattern. One can choose to solve it either in hardware, software or by a combination of both hardware and software. Often the hardware solution is preferred because the software alternative is considered to take too much of the CPU-capacity. However, with the present algorithm the sync-detection is quite easy to handle in software. Compared to the rest of the V.110 processing that usually is done in software, this extra load is very small.

Before the present method or algorithm is described, reference should be made to FIG. 1 illustrating how the 80 bits V.110 frame appears. Octet zero contains all binary 0, whilst octet 5 consist of binary 1 followed by seven E bits. Octets 1–4 and 6–9 contain a binary 1 in bit number one, a status bit (S- or X-bit) in bit number 8 and six data bits (D-bits) in bit positions 2–7. The order of bit transmission is from left to right and top to bottom.

The 17 frame synchronization bits (*) consist of all eight bits set to binary 0 in octet zero and a binary 1 in bit position 1 in the following nine octets. Through this document special attention should be focused on these synchronization bits (*)

At a first glimpse the finding of the synchronization pattern may be considered as quite easy. This would, it is true, obviously be easy if the ten octets always arrive byte-aligned in the computer memory in question. But here is where the problem starts.

When the serial bit stream "ticks" into the receive-buffer in the computer memory, one has no guarantee that the octets in the frame fall into corresponding byte-addressable locations.

FIG. 2 illustrates how odd the serial bit stream may arrive in a byte-addressable computer memory store. Consequently, the V.110 frame octets included in the bit stream appearing in FIG. 2 will not necessarily be byte-aligned as compared with FIG. 1. Hence, each octet may be split between or partly cover two consecutive addresses as regards byte-alignment.

PRIOR ART

From U.S. Pat. No. 5,204,883 (Blanc) there is known a method and an apparatus for recognition of a framing pattern distributed in a serial bit stream. The framing pattern comprises M single bits distributed at intervals of a fixed number, N of bits, as measured from the start of one framing bit to the start of the next, in an incoming serial bit stream. The prior art system makes a computation following each reception of an arbitrary group of N incoming data, and will after a minimum number of computation steps to distinguish between a 'look alike' framing pattern and a 'true' framing pattern, point out with no ambiguity the very position of the 'true' pattern within the bit stream, thus allowing synchronization over that stream.

This prior art describes a method for synchronizing in relation to a bit pattern, wherein each individual bit in the pattern is distributed with randomly arranged user data therebetween.

However, this prior art technique is silent about finding a bit pattern which is not "bit-distributed", and would consequently not be able to use for the recognition of such bit patterns.

U.S. Pat. No. 5,177,738 (Dell'Oro et al.) discloses a process and a monolithically integrated device for speed adaption for integrated services digital networks (ISDN), which process relates to synchronizing and decomposing asynchronous data frames of different lengths of a serial bit stream structured in octet-rows of bits containing frame synchronization bits and data bits, for rate adaption of synchronous and asynchronous terminals of said ISDN during data reception from said network.

EP 0 727 886-A2 (Anderson/Wandel & Golterman Technologies Inc.) discloses a method related to digital data sequence pattern filtering, which method is octet/byte oriented. In practice this will involve that the method is operated on a byte stream, and that a byte alignement can be assumed.

However, this prior art does not give any instructions about a method related to a bit stream, let alone any solution to the problem enfaced with not being byte aligned in relation to the bit pattern to be recognized.

U.S. Pat. No. 5,412,754 (Newley et al.) relates to a pattern recognizing system, comprising a transmitter and receiver for transmitting and receiving a serial stream of bits that includes data bits and a predetermined bit pattern, the system being adapted for recognizing said bit pattern. The system checks each received bit and compares this with the state value of previous bits until the predetermined bit pattern is recognized. This system is a slow system since it requires a comparison or checking operation for each received bit. In other words, this system is silent about conducting a comparison or checking operation only for each 8th received bit.

U.S. Pat. No. 5,412,610 (Suzuki) relates to a serial data transfer device, wherein serial data are transfered to/from an FIFO buffer. However, there is no information in this publication concerning how a special bit pattern can be recognized in such a buffer, for example data which have been received from a serial communication link.

In conclusion, none of the cited references give any instructions regarding how to recognize a synchronization pattern in a frame according to V.110 protocol, let alone that this recognition can be effected by a fast search algorithm for such V.110 synchronization pattern.

SUMMARY OF THE INVENTION

The main object of the present invention is to provide a fast search algorithm for V.110 synchronization pattern.

It is also an object of the invention to provide a fast search algorithm for a FAX application in which the aim is to recognize eleven zeros (0) followed by a single one (1) in a bit stream (known as EOL, i.e. End-Of-Line).

Another object of the present invention is to provide an appropriate CheckBitMaskTable to be used in connection with such a fast search algorithm.

A further object of the present invention is to provide an algorithm in which two arbitrary bit groups or bytes are compared with each other and the result thereof compared with further criteria given by the V.110 frame.

Still another object of the present invention is to provide an algorithm which is easy to handle in software, and which represents only a very small load compared with the related processing in software.

Yet another object of the invention is to provide an algorithm for finding a bit pattern which is not bit distributed.

A still further object of the invention is to provide an algorithm conducting a comparison or checking operation only for each 8th received bit in a bit stream and thereby increasing the speed at which the algorithm can operate.

BRIEF DISCLOSURE OF THE INVENTION

The above objects are achieved in connection with a method as stated in the preamble, which according to the invention is characterized by examining two successive elements, by performing a binary AND operation between the first element and a check element made up from the second element, then examining if the binary AND operation is zero for thereafter establishing whether said first element and second element qualify as candidates for the synchronization pattern, and further verifying said candidates by checking further criteria given by the frame in question.

Further features and advantages given by the present invention will appear from the following description taken in conjunction with the enclosed drawings and appendices, as well as from the enclosed patent claims.

BRIEF DISCLOSURE OF THE DRAWINGS AND APPENDICES

FIG. 1 shows the layout of a 80 bits CCITT V.110 frame. Note the bit numbering scheme used as compared to FIG. 2. When referring octets in V.110 frames the bits are normally numbered 1 through 8 from left to right. The bits in a byte are numbered 0 through 7 starting from right to left as in FIG. 2. The asterisks (*) mark out the frame synchronization bits.

FIG. 2 is a table illustrating the arbitrary serial bit stream as it may have been received into a buffer in a computers memory. Note the asterisks (*) and how odd the octets are aligned with respects to the byte addressable buffer.

Appendix A illustrates an embodiment of a CheckBit-Mask table, which can be used to generate the check value used in connection with the method according to the invention. An entry in the table is a CheckBitMask.

Appendix B is a print out of a computer program which can be used for realizing the method according to the present invention.

DETAILED DESCRIPTION OF EMBODIMENTS OF THE INVENTION

As explained previously in connection with FIG. 1, a V.110 frame synchronization pattern appears as 80 bits, one frame always starting with 8 zero (0) bits followed by a one (1) bit. As illustrated in FIG. 2 the serial bit stream may have a sequential but arbitrary position in the byte-addressable locations, and an embodiment of the present method will be explained in connection with such an arbitrary location in a buffer/array.

While still referring to FIG. 2 the following assumptions should be observed.

The received bit stream is stored in a byte-addressable buffer/array.

The bytes in the buffer are filled from left to right when the bits are ticking in from the serial line, it here being assumed that the most significant bits (MSB) are received first. However, the least significant bits (LSB) can be used as well, but the check byte (explained later) would then have to be mirrored.

When the above assumptions are fulfilled, an embodiment of the present invention may comprise the following steps for each received byte to be examined:

1. Check the byte in question by doing a binary AND operation between the examined byte (in Appendix B program listing "current byte") and a special check byte. The check byte (retrieved from the CheckBit-Mask table) is to have the same number of leading zero bits as there are leading zero bits in the byte that follows the byte in question (in Appendix B program listing, "next byte". The rest of the bits in this check byte has to be set to ones (1"s).

2. If the result of the AND operation is zero and the byte that follows the byte in question is not zero itself, then 8 consecutive zero (0) bits followed by at least one one (1) bit have been found.

The following example making references to FIG. 2 may better explain how it works. During the example the notation byte0, byte1, byte2 and so on refer to the bytes at respective memory offset 0, 1, 2 and so on:

If byte0 should be a candidate for the start of the eight consecutive zero bits, bit b0 through b5 have to be zero since byte1 that follows byte0 contains only 2 leading zero bits (b7 and b6).

A binary AND with byte0 and a byte that has only 2 leading zeros and the rest of the bits set to ones (1's), will give result zero if byte0 is a candidate:

$$\begin{array}{r} 01010000 \\ \text{AND } 00111111 \\ \hline = 00010000 \end{array} \quad \text{non-zero result} \rightarrow \underline{\textit{byte0}} \text{ is not a candidate}$$

If byte1 should be a candidate for the start of the eight consecutive zero bits, bit b0 through b3 have to be zero since byte2 contains four leading zero bits (b7 through b4).

A binary AND with byte1 and a byte that has four leading zeros and the rest of the bits set to ones (1's), will give result zero if byte1 is a candidate:

$$\begin{array}{r} 00110000 \\ \text{AND } 00001111 \\ \hline = 00000000 \end{array} \quad \text{zero result} \rightarrow \underline{\textit{byte1}} \text{ is a candidate}$$

Eight consecutive zero (0) bits have been found. The first four are found in byte1 bit b3–b0 and the rest follow in the byte2 bit b7–b4. Since byte2 is non-zero the first sync bit that is set (bit 8 in octet 1 FIG. 1) must be contained in byte2 at bit position b3. But since b3 is not set in all eight bytes byte3 . . . byte8, byte1 can not be part of the sync pattern, thus continue checking byte2.

The binary AND with byte2 and a byte that has 8 leading zeros (same number of leading zeros as in byte3) will always give zero result, but since byte3 is zero itself the 8 consecutive zero bits followed by a one (1) bit can not start within byte2, thus byte2 is discarded too.

Continuing binary AND'ing byte3 with a byte that has 2 leading zeros (same number of leading zeros as in byte4)

give zero result, thus we must check the remaining ones (1) sync bits. Since first leading one (1) bit in byte4 is found at bit position b5, bit b5 has to be checked in the remaining bytes byte5 . . . byte12. Since such b5 positions are all set in these bytes, a valid start has been found.

Appendix B shows a C-implementation of the algorithm above.

APPENDIX A

CheckBitMaskTable

| Entry number | Binary contents |
|---|---|
| 000 | 00000000 |
| 001 | 00000001 |
| 002 | 00000011 |
| 003 | 00000011 |
| 004 | 00000111 |
| 005 | 00000111 |
| 006 | 00000111 |
| 007 | 00000111 |
| 008 | 00001111 |
| 009 | 00001111 |
| 010 | 00001111 |
| 011 | 00001111 |
| 012 | 00001111 |
| 013 | 00001111 |
| 014 | 00001111 |
| 015 | 00001111 |
| 016 | 00011111 |
| 017 | 00011111 |
| 018 | 00011111 |
| 019 | 00011111 |
| 020 | 00011111 |
| 021 | 00011111 |
| 022 | 00011111 |
| 023 | 00011111 |
| 024 | 00011111 |
| 025 | 00011111 |
| 026 | 00011111 |
| 027 | 00011111 |
| 028 | 00011111 |
| 029 | 00011111 |
| 030 | 00011111 |
| 031 | 00011111 |
| 032 | 00111111 |
| 033 | 00111111 |
| 034 | 00111111 |
| 035 | 00111111 |
| 036 | 00111111 |
| 037 | 00111111 |
| 038 | 00111111 |
| 039 | 00111111 |
| 040 | 00111111 |
| 041 | 00111111 |
| 042 | 00111111 |
| 043 | 00111111 |
| 044 | 00111111 |
| 045 | 00111111 |
| 046 | 00111111 |
| 047 | 00111111 |
| 048 | 00111111 |
| 049 | 00111111 |
| 050 | 00111111 |
| 051 | 00111111 |
| 052 | 00111111 |
| 053 | 00111111 |
| 054 | 00111111 |
| 055 | 00111111 |
| 056 | 00111111 |
| 057 | 00111111 |
| 058 | 00111111 |
| 059 | 00111111 |
| 060 | 00111111 |
| 061 | 00111111 |
| 062 | 00111111 |
| 063 | 00111111 |
| 064 | 01111111 |

APPENDIX A-continued

CheckBitMaskTable

| Entry number | Binary contents |
|---|---|
| 065 | 01111111 |
| 066 | 01111111 |
| 067 | 01111111 |
| 068 | 01111111 |
| 069 | 01111111 |
| 070 | 01111111 |
| 071 | 01111111 |
| 072 | 01111111 |
| 073 | 01111111 |
| 074 | 01111111 |
| 075 | 01111111 |
| 076 | 01111111 |
| 077 | 01111111 |
| 078 | 01111111 |
| 079 | 01111111 |
| 080 | 01111111 |
| 081 | 01111111 |
| 082 | 01111111 |
| 083 | 01111111 |
| 084 | 01111111 |
| 085 | 01111111 |
| 086 | 01111111 |
| 087 | 01111111 |
| 088 | 01111111 |
| 089 | 01111111 |
| 090 | 01111111 |
| 091 | 01111111 |
| 092 | 01111111 |
| 093 | 01111111 |
| 094 | 01111111 |
| 095 | 01111111 |
| 096 | 01111111 |
| 097 | 01111111 |
| 098 | 01111111 |
| 099 | 01111111 |
| 100 | 01111111 |
| 101 | 01111111 |
| 102 | 01111111 |
| 103 | 01111111 |
| 104 | 01111111 |
| 105 | 01111111 |
| 106 | 01111111 |
| 107 | 01111111 |
| 108 | 01111111 |
| 109 | 01111111 |
| 110 | 01111111 |
| 111 | 01111111 |
| 112 | 01111111 |
| 113 | 01111111 |
| 114 | 01111111 |
| 115 | 01111111 |
| 116 | 01111111 |
| 117 | 01111111 |
| 118 | 01111111 |
| 119 | 01111111 |
| 120 | 01111111 |
| 121 | 01111111 |
| 122 | 01111111 |
| 123 | 01111111 |
| 124 | 01111111 |
| 125 | 01111111 |
| 126 | 01111111 |
| 127 | 01111111 |
| 128 | 11111111 |
| 129 | 11111111 |
| 130 | 11111111 |
| 131 | 11111111 |
| 132 | 11111111 |

APPENDIX A-continued

CheckBitMaskTable

| Entry number | Binary contents |
|---|---|
| 133 | 11111111 |
| 134 | 11111111 |
| 135 | 11111111 |
| 136 | 11111111 |
| 137 | 11111111 |
| 138 | 11111111 |
| 139 | 11111111 |
| 140 | 11111111 |
| 141 | 11111111 |
| 142 | 11111111 |
| 143 | 11111111 |
| 144 | 11111111 |
| 145 | 11111111 |
| 146 | 11111111 |
| 147 | 11111111 |
| 148 | 11111111 |
| 149 | 11111111 |
| 150 | 11111111 |
| 151 | 11111111 |
| 152 | 11111111 |
| 153 | 11111111 |
| 154 | 11111111 |
| 155 | 11111111 |
| 156 | 11111111 |
| 157 | 11111111 |
| 158 | 11111111 |
| 159 | 11111111 |
| 160 | 11111111 |
| 161 | 11111111 |
| 162 | 11111111 |
| 163 | 11111111 |
| 164 | 11111111 |
| 165 | 11111111 |
| 166 | 11111111 |
| 167 | 11111111 |
| 168 | 11111111 |
| 169 | 11111111 |
| 170 | 11111111 |
| 171 | 11111111 |
| 172 | 11111111 |
| 173 | 11111111 |
| 174 | 11111111 |
| 175 | 11111111 |
| 176 | 11111111 |
| 177 | 11111111 |
| 178 | 11111111 |
| 179 | 11111111 |
| 180 | 11111111 |
| 181 | 11111111 |
| 182 | 11111111 |
| 183 | 11111111 |
| 184 | 11111111 |
| 185 | 11111111 |
| 186 | 11111111 |
| 187 | 11111111 |
| 188 | 11111111 |
| 189 | 11111111 |
| 190 | 11111111 |
| 191 | 11111111 |
| 192 | 11111111 |
| 193 | 11111111 |
| 194 | 11111111 |
| 195 | 11111111 |
| 196 | 11111111 |
| 197 | 11111111 |
| 198 | 11111111 |
| 199 | 11111111 |
| 200 | 11111111 |
| 201 | 11111111 |
| 202 | 11111111 |
| 203 | 11111111 |
| 204 | 11111111 |
| 205 | 11111111 |
| 206 | 11111111 |
| 207 | 11111111 |
| 208 | 11111111 |
| 209 | 11111111 |
| 210 | 11111111 |
| 211 | 11111111 |
| 212 | 11111111 |
| 213 | 11111111 |
| 214 | 11111111 |
| 215 | 11111111 |
| 216 | 11111111 |
| 217 | 11111111 |
| 218 | 11111111 |
| 219 | 11111111 |
| 220 | 11111111 |
| 221 | 11111111 |
| 222 | 11111111 |
| 223 | 11111111 |
| 224 | 11111111 |
| 225 | 11111111 |
| 226 | 11111111 |
| 227 | 11111111 |
| 228 | 11111111 |
| 229 | 11111111 |
| 230 | 11111111 |
| 231 | 11111111 |
| 232 | 11111111 |
| 233 | 11111111 |
| 234 | 11111111 |
| 235 | 11111111 |
| 236 | 11111111 |
| 237 | 11111111 |
| 238 | 11111111 |
| 239 | 11111111 |
| 240 | 11111111 |
| 241 | 11111111 |
| 242 | 11111111 |
| 243 | 11111111 |
| 244 | 11111111 |
| 245 | 11111111 |
| 246 | 11111111 |
| 247 | 11111111 |
| 248 | 11111111 |
| 249 | 11111111 |
| 250 | 11111111 |
| 251 | 11111111 |
| 252 | 11111111 |
| 253 | 11111111 |
| 254 | 11111111 |
| 255 | 11111111 |

APPENDIX B

```
/************************************************************************
*
* Routine:      V110SyncSearch
*
* Description:  Search through an array in order to find a correct V.110
*               frame synchronization pattern. If routine return
*               an error free frame has been found. Note that RxSynBitPos
*               return bit positions within 1-8. 1 correspond to bit 0, LSB
*               and 8 means bit 7 MSB within a byte.
*               Also note that this routine expects the serial stream to
*               fill the bytes from MSB towards LSB before moving to next
*               byte. That means MSB is sent/received first.
*               Input and output are passed using global variables.
*
*
* Input:        unsigned char   RxDataStream[ ]      Array containing received
*                                                    bit stream
*               unsigned char   *RxSyncByte          Pointer where to start
*                                                    searching
*               unsigned int    BytesInRxDataStream  Number of received bytes
*
* Output:       unsigned char   *RxSyncByte          Points at start of frame
*                                                    if any found
*               unsigned char   RxSyncBitPos         Bit position within
*                                                    RxSyncByte at where frame
*                                                    begin if any found
*               unsigned int    BytesInRxDataStream  Number of bytes left in
*                                                    serial stream
*
*
* Return:       = 0 :   Sync error-free frame found, RxSyncByte and
*                       RxSyncBitPos tells where the frame is located
*               < > 0:  No start of frame found
*
*
* Copyright:    Ericsson AS
*
* Written:      1996-09-25 Bjoern Birkeland
*
*
************************************************************************/
int V110SyncSearch(void) {
    /* Define look up table for V.110 synchronization search */
    static const struct SYNCTEST_STR SyncTestTable[256] = {
        {0x00,0x08}, {0x01,0x01}, {0x03,0x02}, {0x03,0x02}, {0x07,0x03},
        {0x07,0x03}, {0x07,0x03}, {0x07,0x03}, {0x0F,0x04}, {0x0F,0x04},
        {0x0F,0x04}, {0x0F,0x04}, {0x0F,0x04}, {0x0F,0x04}, {0x0F,0x04},
        {0x0F,0x04}, {0x1F,0x05}, {0x1F,0x05}, {0x1F,0x05}, {0x1F,0x05},
        {0x1F,0x05}, {0x1F,0x05}, {0x1F,0x05}, {0x1F,0x05}, {0x1F,0x05},
        {0x1F,0x05}, {0x1F,0x05}, {0x1F,0x05}, {0x1F,0x05}, {0x1F,0x05},
        {0x1F,0x05}, {0x1F,0x05}, {0x3F,0x06}, {0x3F,0x06}, {0x3F,0x06},
        {0x3F,0x06}, {0x3F,0x06}, {0x3F,0x06}, {0x3F,0x06}, {0x3F,0x06},
        {0x3F,0x06}, {0x3F,0x06}, {0x3F,0x06}, {0x3F,0x06}, {0x3F,0x06},
        {0x3F,0x06}, {0x3F,0x06}, {0x3F,0x06}, {0x3F,0x06}, {0x3F,0x06},
        {0x3F,0x06}, {0x3F,0x06}, {0x3F,0x06}, {0x3F,0x06}, {0x3F,0x06},
        {0x3F,0x06}, {0x3F,0x06}, {0x3F,0x06}, {0x3F,0x06}, {0x3F,0x0G},
        {0x3F,0x06}, {0x3F,0x06}, {0x3F,0x06}, {0x3F,0x06}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0x7F,0x07}, {0x7F,0x07},
        {0x7F,0x07}, {0x7F,0x07}, {0x7F,0x07}, {0xFF,0x08}, {0xFF,0x08},
        {0xFF,0x08}, {0xFF,0x08}, {0xFF,0x08}, {0xFF,0x08}, {0xFF,0x08},
        {0xFF,0x08}, {0xFF,0x08}, {0xFF,0x08}, {0xFF,0x08}, {0xFF,0x08},
        {0xFF,0x08}, {0xFF,0x08}, {0xFF,0x08}, {0xFF,0x08}, {0xFF,0x08},
        {0xFF,0x08}, {0xFF,0x08}, {0xFF,0x08}, {0xFF,0x08}, {0xFF,0x08},
        {0xFF,0x08}, {0xFF,0x08}, {0xFF,0x08}, {0xFF,0x08}, {0xFF,0x08},
        {0xFF,0x08}, {0xFF,0x08}, {0xFF,0x08}, {0xFF,0x08}, {0xFF,0x08},
        {0xFF,0x08}, {0xFF,0x08}, {0xFF,0x08}, {0xFF,0x08}, {0xFF,0x08},
        {0xFF,0x08}, {0xFF,0x08}, {0xFF,0x08}, {0xFF,0x08}, {0xFF,0x08},
        {0xFF,0x08}, {0xFF,0x08}, {0xFF,0x08}, {0xFF,0x08}, {0xFF,0x08},
        {0xFF,0x08}, {0xFF,0x08}, {0xFF,0x08}, {0xFF,0x08}, {0xFF,0x08},
```

APPENDIX B-continued

```
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}, {0xFF,0x08}, {0xFF,0x08}, {0xFF,0x08}, {0xFF,0x08},
            {0xFF,0x08}}
    unsigned char          *current_byte;
    unsigned char          *next_byte;
    unsigned char          *tmp_byte;
    unsigned int            sync_errors;
    unsigned char           chk_bit;
    struct SYNCTEST_STR    sync_test;
    current_byte = RxSyncByte;
    do {
        sync_errors = 17;
        next byte = current_byte+1;
        /* Check for buffer-wrap around condition */
        if (next byte > &RxDataStream[ RX_BUF_SIZE-1]) {
            next_byte = &RxDataStream[ 0 ];
        }
        /* Look up check byte and bit position */
        sync_test = SyncTestTable[ *next_byte];
        /* Check current byte */
        if (!(*current_byte & sync_test.check byte)){
            /* Yes, enough zero bits found, check that */
            /* next byte contains a one(1) bit:      */
            if (*next_byte){
                /* Yes it did, now check that the remaining */
                /* eight sync bits are set to binary 1:      */
                tmp_byte = next_byte;
                sync_errors = 9;
                chk_bit = (1<<(sync_test.bit_pos-1));
                do {
                    if (tmp_byte==&RxDataStream[ RX_BUF_SIZE-1]){
                        tmp_byte = &RxDataStream[ 0 ];
                    }
                    else {
                        tmp_byte++;
                    }
                    /* Leave loop at first sync bit that is not set, or */
                    /* when sync_errors has counted down to zero        */
                } while((*tmp_byte & chk_bit) && (--sync_errors));
                /* Did sync_errors reach zero? */
                if (!sync_errors){
                    /* Yes, error free frame! Update new sync position */
                    /* and return with "no sync errors"                */
                    RxSyncByte = current_byte;
                    RxSyncBitPos = sync_test.bit_pos;
                    return(sync_errors);
                }
            }
        }
        current_byte = next_byte;
    } while ((--BytesInRxDataStream > V110_FRAME_SIZE) && sync_errors);
    return(sync_errors);
}
```

What is claimed is:

1. A method for detecting a fixed bit pattern in serial data stored as successive non-aligned byte elements in a buffer, comprising the steps of:

performing an AND bit operation between a first byte element and a check element computed from a second byte element immediately following the first element; and examining the results of the AND bit operation for thereafter establishing whether said first byte element and second byte element qualify as candidates for the pattern given by aligned successive byte elements.

2. A method as claimed in claim 1, comprising the following steps:

examining a first byte in a buffer in which a bit stream of said serial data has been received;

examining a second byte following said first byte;

computing a check byte based on said second byte;

performing a binary AND operation between values of said first byte and said check byte;

examining said AND operation to check whether 8 consecutive zero bits are found;

examining the bit position of a first '1' bit in said second byte; and checking corresponding '1' bit positions In each remaining byte, respectively, to verify correct synchronization pattern.

3. A method as claimed in claim 1, comprising the following steps:

initializing a first pointer to point at a first byte in a buffer, that might contain the start of a frame;

initializing a second pointer to point at the next byte that follows the byte at which the first pointer point;

using the value of the byte at which the second pointer points, to look up the CheckBitMask from a CheckBitMask Table array;

effecting a binary AND operation of the value of the byte at which the first pointer points with the value of the CheckBitMask found in CheckBitMaskTable, and check whether result is zero;

if result is not zero, discarding the byte at which the first pointer points and advancing the first pointer to the next byte to be examined, and advancing the second pointer to the next byte in the buffer;

if more bytes exist in the buffer then use the value of the byte at which the second pointer points, else terminate search with no hit; and if the second pointer points at a zero byte then discarding said byte, else checking whether at least 8 consecutive zero bits (0's) followed by a one bit ('1') is found.

4. A method as claimed in claim 3, further comprising checking whether the next eight bytes contain a one bit (>1') at the same bit-position as the left-most one bit (>1') in the byte at which the second pointer points, for thereby verifying that a correct synchronizaton pattern has been found.

5. A method as claimed in claim 1, wherein the check element obtained using a CheckBitMask Table having 256 entries, each of which containing a CheckBitMask which is a 8-bit wide pattern, and each entry containing a pattern made up of leading zero bits ('0'bits) corresponding to leading zero bits (>0'-bits) in the entry's position number itself, whereas the rest of the entry's bits are set to one bit (>1'-bits), respectively.

6. A method as claimed in claim 1, wherein the check element is obtained using a CheckBitMask table adapted to be used in connection with bit streams wherein the most significant bits (MSB) are received first.

7. A method as claimed claim 1, wherein the check element is obtained using a CheckBitMask Table adapted to be used in connection with bit streams wherein the least significant bits (LSB) are received first.

8. An iterative method of detecting a fixed bit pattern in serial data stored as non-aligned bit patterns in a buffer, the buffer comprising a plurality of logically sequential bytes, comprising the steps of:

performing a bitwise AND operation between a first byte and a check byte computed from a second byte immediately following the first byte, the check byte consisting of the same number of leading zero bits as the second byte, and the remainder of the bits set to 1; and if the bitwise AND operation yields a zero byte, then successively checking the bit in the column corresponding to the most significant 1 in the check byte computed from the second byte to determine whether the bits match the pattern.

9. In a memory structure comprising M columns and N rows, an iterative method of detecting a fixed bit pattern in serial data, the fixed bit pattern comprising M successive '0' bits followed by Z rows beginning with a A1", comprising the steps of:

initializing a first pointer to point at a first row in a buffer;

initializing a second pointer to point at the mw following the current-row;

retrieving a CheckBitMask corresponding to the value of binary data stored in the row identified by the second pointer;

performing a binary AND operation of the current-row with the value of the CheckBitMask; and if result of the binary AND operation is not zero, advancing the first pointer and the second pointer one row in the memory structure.

10. A method according to claim 9, further comprising the step of:

if the result of the binary AND operation is zero, then examining the Z-1 rows following the current-row to determine whether the serial data corresponds to the fixed bit pattern.

11. A method according to claim 10, wherein examining the Z-1 rows following the current row comprises sequentially checking the column corresponding to the most-significant non-zero bit of the CheckBitMask.

* * * * *